Jan. 1, 1929. O. L. KIPP Re. 17,176
CONCRETE PAVEMENT FINISHING MACHINE
Original Filed April 16, 1923 2 Sheets-Sheet 1
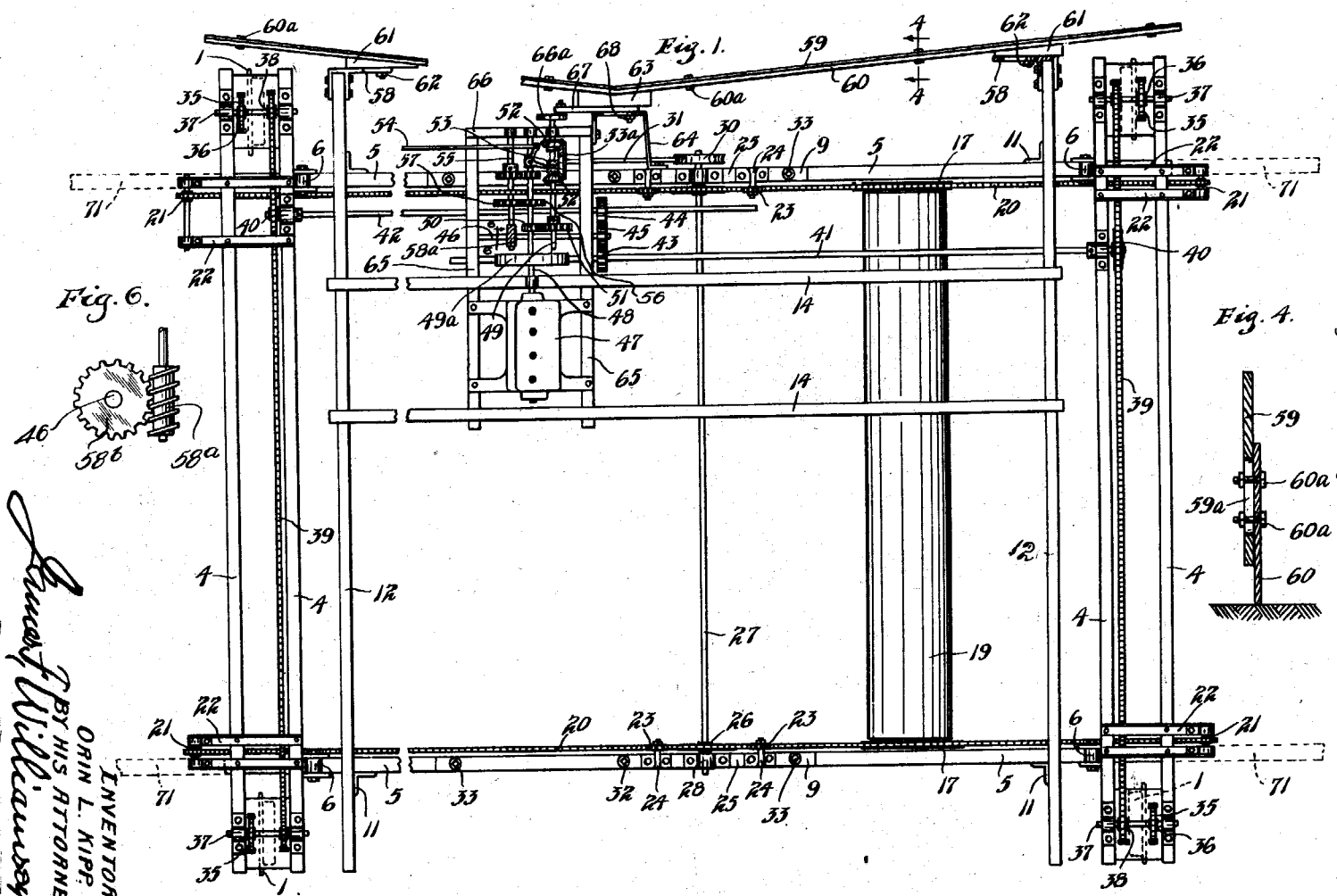
INVENTOR.
ORIN L. KIPP.
BY HIS ATTORNEY.
James F. Williamson Jan. 1, 1929. O. L. KIPP Re. 17,176
CONCRETE PAVEMENT FINISHING MACHINE
Original Filed April 16, 1923 2 Sheets-Sheet 2
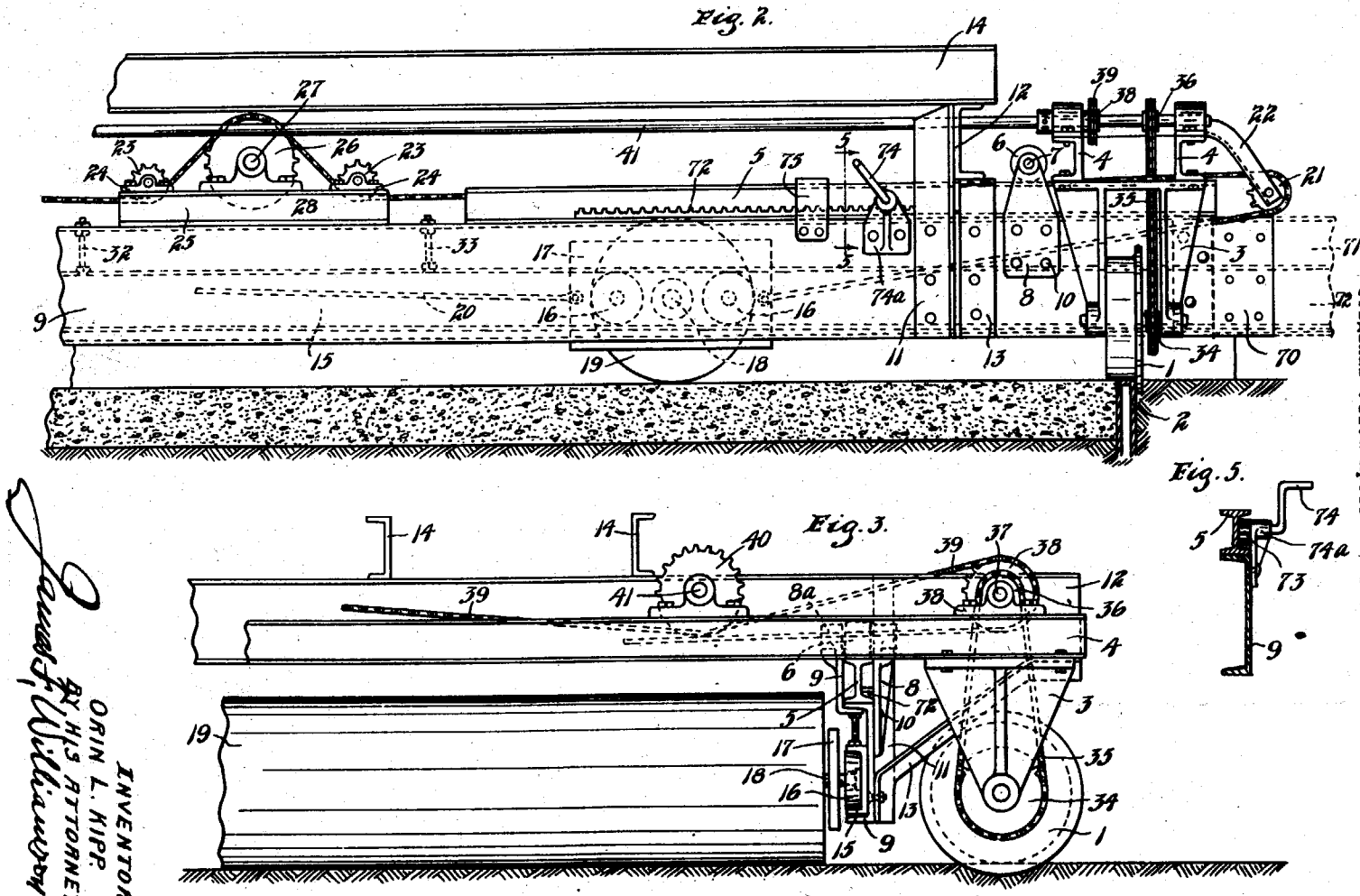
INVENTOR.
ORIN L. KIPP.
BY HIS ATTORNEY.
James F. Williamson Reissued Jan. 1, 1929. Re. 17,176

UNITED STATES PATENT OFFICE.

ORIN L. KIPP, OF ST. PAUL, MINNESOTA.

CONCRETE-PAVEMENT-FINISHING MACHINE.

Original application filed April 16, 1923, Serial No. 632,188. Renewed April 4, 1927. Original No. 1,629,276, dated May 17, 1927. Application for reissue filed November 4, 1927. Serial No. 231,147.

This invention relates to a road making machine and particularly to such a machine adapted to operate on concrete or cement roads. In making concrete roads it has heretofore been the practice to deposit the concrete on the roadbed foundation and then to level off the layer of concrete by screed bars or boards which are moved over the surface of the concrete layer. This procedure takes considerable time and labor and the resulting road surface is usually not uniform.

It is an object of this invention to provide means for forming the surface of the concrete layer and properly shaping the same comprising a roller which is moved over the said surface.

It is a further object of the invention to provide a machine comprising a frame supported upon trucks adapted to move along the road at the side thereof, which frame comprises members extending across the road and forming a guiding means for a roller which is reciprocated across the road.

It is a further object of the invention to provide said frame members which extend across the road with means for guiding the roller in a non-rectilinear path whereby a crowned surface may be given to the road.

It is still another object of the invention to provide such a machine having a bar extending across the road at the front thereof for roughly shaping the surface, which bar, preferably is provided with reciprocating means.

It is a still further object of the invention to provide a machine having a frame adapted to carry a motor together with means driven from the motor for turning the truck wheels to progress the machine, for reciprocating the said roller and for reciprocating the screed bar at the front of the machine.

These and other objects and advantages of the invention will be fully set forth in the following description made in connection with the accompanying drawings in which like reference characters refer to the same parts throughout the different views, and in which, Fig. 1 is a plan view of the machine;

Fig. 2 is a view in side elevation of one end of the machine;

Fig. 3 is a view in end elevation of one side of the machine;

Fig. 4 is a vertical section taken on the line 4—4 of Fig. 1;

Fig. 5 is a vertical section taken on the line 5—5 of Fig. 2;

Fig. 6 is a vertical section taken on the line 6—6 of Fig. 1.

Referring to the drawings, the machine comprises truck wheels 1 which are disposed at each side of the road and which may travel on track members 2 provided therefor. The said wheels are spaced longitudinally of the road and journaled in frames or brackets 3 having flat flanges at the top thereof, said brackets having depending bearing carrying arms between which the wheels 1 revolve. The bearings 3 with the wheels at each side of the road are connected by spaced channel members 4 which are bolted to the top flanges of the brackets 3. I-beams 5 extend transversely of the channels 4 and beneath the same and are bolted thereto by bolts extending through the flanges of said channels. The I-beams 5 extend toward each other from each side of the machine and a roller 6 rests upon the top of each of said I-beams which is carried on an axle 7 supported in bearings 8 and 8[a]. The bearing 8 has a flange extending downwardly and adapted to lie in flat contact with a larger channel 9 to which it is secured by spaced bolts or rivets 10. The bearing 8[a] extends downwardly at the other side of the beam 5 and has a horizontal flange disposed under and connected to the upper flange of the channel 9. The large channel 9 is thus supported from the I-beam 5 and there is one of the channels 9 extending transversely between the respective pairs of channels 4 at each end of the machine. The channels 9 have bolted to the outside thereof, adjacent the bearings 8 one of the flanges of the angle members 11 which extend upwardly and have bolted to their other flanges, channel members 12 which extend across the top of I-beam 5, parallel to the channel members 4. Other angle members 13 have one of their flanges bolted to the outside of the channels 9 above the bottom thereof and extended outwardly and upwardly adjacent the ends of the channel members 12 to which the horizontal flanges thereof are bolted or riveted. The channel members 12, in turn, have extending therebetween and resting thereon channel members 14, the latter members being secured to the members 12 in any suitable manner.

The channel members 9 have secured to the inside thereof adjacent their bottoms smaller channels 15 adapted to form guideways for roller members 16 journaled on stub shafts secured in block members 17 in the central portion of which are journaled trunnions 18 of a comparatively larger roller 19 which extends between the blocks 17. The machine is similar in construction at each end and each side and a description of one of said ends and sides will be sufficient to understand the structure. Only a portion of one end therefore is shown in Fig. 3 and only a portion of one side in Fig. 2, it being understood that these structures are duplicated at the other end and side of the machine respectively. The blocks 17 have secured at each end thereof beyond the rollers 16, the ends of a chain member 20, each end of which chain passes from the block toward one end of the machine and passes over a sprocket 21 secured to a shaft journaled in pairs of angle members 22 extending across the top and downwardly beyond the channel members 4 to which they are secured. Between the sprockets 21 the upper run of the chain 20 passes under sprockets 23 carried on short shafts mounted in bearings 24 secured to a short section of channel 25 resting upon and secured to the top of the channel member 9. Between the sprockets 23 the chain passes over a larger sprocket 26 secured to a shaft 27 which is journaled in a bracket 28 secured to the member 25. It will be understood that there is a member 25 with its attached parts secured to each of the members 9 and the shaft 27 extends between the members 9 and the members 25 secured thereto. Said shaft 27 has its end projected beyond the front member 9 and has secured to said end a worm wheel gear 30 driven by a worm gear secured at a shaft 31 which is, in turn, driven by mechanism to be later described. It will be seen that if the wheels 26 are driven the chain 20 will be progressed and the blocks 17 and roller 19 moved in one direction or the other. The channel member 15 is connected to the top web of the channel member 9 by a central bolt 32 and bolts 33 at each side thereof, said bolts being provided with jamb nuts at each side of each web of the channels. The central bolt 32 with the nuts thereon is adapted to draw the central part of the channel 15 upwardly, the end portions of said channel being held and forced downwardly by the bolts 33 and the nuts thereon whereby the channel is flexed and is given curved form with the central portion thereof higher than the end portions.

The wheels 1 are equipped with sprocket wheels 34 over which run chains 35 also running over sprocket wheels 36 secured to the shafts 37 carried in bearings 38 bolted to the top of the members 4 adjacent the ends thereof. The shafts 37 also carry sprockets 38 and chains 39 run over these sprockets on the shafts at each end of the respective pairs of channels 4. The upper runs of the chains 39 are engaged by sprocket wheels 40, as illustrated in Figs. 1 and 3, one of which sprockets 40 is carried on a shaft 41 and the other of which is carried on a shaft 42, which shafts project inwardly from the inside members 4 and have secured thereto, respectively, the gears 43 and 44. These gears are disposed on opposite sides of and mesh with another gear 45 carried upon a shaft 46. The frame members 14 are adapted to support a suitable motor 47 which may be of any suitable type such as a steam engine, internal combustion motor or electric motor. The motor 47 is illustrated as an internal combustion motor the driving shaft of which is shown as 48 and carries the usual fly wheel 49[a]. The shaft 48 drives another shaft 49 through the reducing gears 50 and 51, which shaft 49 is equipped with a pair of oppositely facing beveled gears 52 meshing with a larger beveled gear 53[a] on the shaft 31 to which reference has been made. The gears 52 are mounted to turn loosely on the shaft 49 but are adapted to be connected thereto by engagement with a sliding clutch member 53 controlled through a pivoted bell crank lever by the rod 54. By connecting one or the other of the gears 52 with the clutch 53 the shaft 31 can be driven in either direction and will, in turn, drive shaft 27 in either direction and move roller 19 in one direction or the other between the sides of the frame. The shaft 48 also drives the shaft 55 through the gears 56 or 57 and the shaft 55, by means of the worm gear 58[a], drives the shaft 46 to which a worm wheel gear is secured meshing with the worm gear 56.

The channel members 12 are extended at the front of the machine and have bolted thereto parallel flanges extending from plates 58, which plates 58 extend transversely of the members 12. A screed blade comprising portions 59 and 60 has members 61 secured to the rear thereof carrying bolts 62 passing through longitudinal slots in the plates 58, said bolts being slidable in said slots and held in place by suitable nuts applied thereto. The members 59 and 60 as clearly shown in Fig. 1, converge toward the center of the machine where they meet in a very obtuse angle and at which portion they have secured thereto a member 63 having a bolt 68 projecting therefrom through a horizontal slot in a bracket 64 bolted to one of the members 9 and one of the auxiliary frame members 65. A shaft 49 projects at one side of the auxiliary frame member 66 and has a crank disk 66[a] at said end connected by a suitable crank pin with a pitman link 67 which is connected at its other end to the bolt 68 projecting through brackets 64. The blades 59 and 60 are, hence, given a lateral reciprocating motion and are guided in the brackets 58 and 64. As shown in Fig. 4, the bar or plate 60 is vertically adjustable on the bar or plate 59, the latter being provided with slots 59ª receiving headed and nutted bolts 60ª passing through the plate 60. The bottom edge of the plate 60 inclines upwardly toward the center thereof, as clearly shown in Fig. 2.

At times, roads of extra width are made and it is a general practice to make the road wider at curves. In making such extra wide portions it is desirable to have extra travel given to the roller 19. The channel members 9, therefore, have bolted to the ends thereof junction plates 70 adapted to have bolted thereto extension channels 71 similar to the channels 9. When the extension members 71 are used the wheels 1 and parts carried thereby including the channel members 4 should be moved outwardly and for this purpose the I-beam 5 is provided on its lower and outer web with a rack member 72 adapted to be engaged by a pinion 73 carried on a shaft journaled in a bearing 74ª bolted to the outside of the channel 9, which shaft is adapted to be turned by a hand crank 74. There will, of course, be a rack 72 and hand crank 74 for each of the I-beams 5 and when the said hand cranks are turned the channel members 4, brackets 3 and attached parts will be moved outwardly with the I-beam the latter sliding on the top of channels 9 and being held in engagement therewith by the yoke members 75 bolted to said channels and extending over the tops of I-beams 5. The end portions of the frame of the machine are thus moved outwardly with the wheels 1 and the roller 8 can thus be given a greater lateral travel. It will be understood that the extension section 71 of the channels 9 will also contain and have secured therein smaller channels 72 of the same size as the channels 15 and adapted to abut the ends thereof.

In operation, the machine will be disposed at the proper place on the road where the concrete layer is being laid and the machine can be progressed by power from the motor 47 transmitted through the shafts 41 and 42 which, in turn, drives the chains 39. The chains 39 drive the shafts 37 which, through sprockets 36 and chains 35 turn the wheels 1. As the machine moves forwardly after the layer of concrete has been placed on the roadbed, said layer will be leveled off to approximately the right shape by the plate or bar 60. This plate, as already described, is given a longitudinal reciprocating movement transversely of the road which will assist in properly surfacing or screeding the concrete layer and will relieve the resistance of the particles of concrete to the movement of the machine. By thus progressing the machine, the roller 19 is brought over the newly laid concrete. The rod 54 is now operated to move the clutch block 53 successively into engagement with the gears 52 and the roller 19 is moved across the road on top of the layer by shaft 27 and chains 20. Owing to the flexed shape of the channel 15, the roller will not travel in a rectilinear path but in a path which is higher at the center so that a desirable crown effect will be given the surface of the road. The roller 19 rests lightly upon the concrete and as it is reciprocated over the same, securely packs and evens the surface thereof forcing the hard particles into the body of the concrete and permits the grout and cement to make the desired smooth surface. After one section of the road is thus treated the machine will, of course, be moved forwardly to the next section on which the concrete has been in the meantime deposited. The action of the machine is quite rapid and the construction of the road can be speedily progressed. Where wider portions of the road are made, the extensions 71 and 72 will be bolted to the plate 70 and the end frames and wheels at the wide side of the road moved outwardly. The roller 19 can then be traversed over the extra width of the road, it being understood, of course, that the chain 20 will have to be lengthened.

When the layer of concrete has been placed on the roadbed, said layer will be leveled off to approximately the right shape by the plate or bar 60. As the arms of this plate diverge from the center the surplus concrete in the layer will be moved away from the edges of the pavement and toward the center thereof. The surplus concrete will thus not be pushed over the edges of the pavement where it will have to again be collected. Owing to the fact that the plate 60 is reciprocated, the surplus concrete is struck off or leveled by a partial shearing action instead of a straight push, thus reducing the power required to move the said plate. This reciprocating action also results in a better and smoother surface on the concrete as the hard particles thereof tend to seat in the concrete and not to be pushed out of position. As the truck wheels of the device are moved and the machine slowly moves forward, the gearing will be thrown into action to reciprocate the roller 19 over the surface of the road. Preferably, the machine is advanced about one foot while the roller moves entirely across the road in one direction. The channel 15, at the forward side of the machine, will be disposed somewhat higher than the channel 15 at the rear side of the machine so that the roller 19 will have an upward inclination forwardly. The concrete layer is thus compressed to a lower level by the successive movements of the roller thereacross. This compression is obtained without vibration by the movement of the roller. Such vibration is objectionable and tends to produce a vertical displacement of the forms. Generally, the roller will be from 1/4 of an inch to 1/2 inch higher at its forward end than at its rear end and said roller will be about ten feet in length. A compression of 1/20th to 1/40th of an inch is thus obtained by each reciprocation of the roller. The roller is held in position to give the exact crown desired by the channel members 15. The compression of the concrete layer by the roller squeezes out the surplus moisture which flushes off the road and this eliminates one of the frequent causes of surface scaling and the formation of depressions by moisture standing on the surface. The action of the roller produces a smooth surface and also eliminates the short choppy waves often cased by machines having a reciprocating bar for screeding the concrete. As already set forth, the roller can move out on the extensions to take care of extended widths of the roads at curves and other places so as to eliminate the use of a temporary false form. When such wider portions of the road are made the extensions 71 and 72 will be bolted to the plate 70 and the end frames and wheels at the wide side of the road moved outwardly. The roller can then be traversed over the extended width as described, the length of the chain 20, of course, being correspondingly increased.

From the above description it is seen that applicant has provided a very efficient machine for surfacing roads. The machine is easily constructed from structural steel and can be quite easily and inexpensively made. By the use of the machine the labor and time necessary for building the concrete road are greatly reduced and a more perfect and better road is obtained.

It will, of course, be understood, that various changes may be made in the form, details and arrangement of the device without departing from the scope of applicant's invention, which, generally stated, consists in a device capable of carrying out the objects above enumerated and such as shown and described and defined in the appended claims.

What is claimed is:

1. A machine for operating on concrete and other roads comprising a frame including spaced members extending transversely across the road, a roller for acting on the road movable longitudinally in said members across the road, means for moving said roller, guide means for said roller carried by said members for causing said roller to travel in a non-rectilinear path to form a crowned road surface, and means for adjusting said last mentioned means to vary the path of said roller to give different crown surfaces to said road.

2. A machine for operating on roads having in combination a frame, a truck supporting said frame and movable longitudinally of the road at the sides thereof, said frame including spaced members extending across the road, guide members movable longitudinally of said members, an elongated roller extending substantially the entire distance between said guide members and having trunnions journaled in said guide members, means for moving said guide members in said frame, and a motor on said frame for operating said means.

3. A machine for operating on concrete roads, having in combination, a frame comprising truck wheels spaced longitudinally of the road at each side thereof, longitudinal frame members having brackets secured thereto in which said wheels are journaled, cross members extending between said frame members, guide members carried by said cross members, means movable on said guide members, a roller journaled in said means, means for reciprocating said roller on said frame, said cross members being adapted to have extension sections bolted thereto, and means for moving said longitudinal frame members, brackets and truck wheels outwardly on said extension sections.

4. A machine for operating on concrete roads having in combination, a frame comprising truck wheels spaced longitudinally of the road at each side thereof, longitudinal frame members having brackets secured thereto in which said wheels are journaled, cross members extending between said frame members, guide members carried by said cross members, means movable on said guide members, a roller journaled on said means, means for reciprocating said roller on said frame, a shaft extending between said cross members, transmission gearing driven by said motor for reversibly driving said shaft, sprockets adjacent each end of said sprockets at each end of each of said cross members, and chains running over the sprockets at each end of said shaft and the sprockets at the ends of the respective cross members and having their ends secured to said last mentioned means.

5. A machine for operating on concrete and similar roads having in combination, a frame having spaced side members extending longitudinally substantially at each side of the road, roller supporting means on said frame extending across the road, a roller having a length much greater than its diameter and extending a considerable distance lengthwise in the road, said roller being inclined upwardly towards its forward end, and means for simultaneously advancing said frame and reciprocating said roller across the road, whereby the surface of the road is rolled and shaped and gradually compressed.

6. A machine for operating on concrete and similar roads comprising a frame, inclined spaced members extending transversely across the road, a roller for acting on the road guided by said members for reciprocation across the road, truck wheels at the sides of said frame on which the frame is adapted to move longitudinally of the road, means for moving said frame forwardly on said truck wheels and simultaneously reciprocating said roller across the road, said roller having a length several times its diameter and being higher at the forward side of the machine than at the rear side thereof whereby as the machine is constantly progressed forwardly the road is compressed under the low end of said roller.

7. A machine for operating on concrete roads comprising a frame, inclined spaced supports extending transversely across the road, a member for smoothing and compacting the road guided by said supports for reciprocation across the road, supporting means at the sides of said frame upon which the frame is adapted to move longitudinally of the road, means for moving said frame forwardly on said supporting means and simultaneously reciprocating said member across the road, said member having a length several times its width and being higher at the forward side of the machine than at the rear side thereof, whereby as the machine is constantly progressed forwardly, the material is progressively compacted and the road is shaped by said member.

In testimony whereof I affix my signature.

ORIN L. KIPP.